United States Patent [19]
Bowen et al.

[11] 3,999,837
[45] Dec. 28, 1976

[54] LIGHT TRANSMITTING FIBER BUNDLE CONNECTOR

[75] Inventors: Terry Patrick Bowen, Etters; Leon Thomas Ritchie, Mechanicsburg; Homer Ernst Henschen, Carlisle, all of Pa.

[73] Assignee: AMP Incorporated, Harrisburg, Pa.

[22] Filed: Jan. 3, 1975

[21] Appl. No.: 538,502

[52] U.S. Cl. .............................. 350/96 C
[51] Int. Cl.² ........................... G02B 5/16
[58] Field of Search ......... 350/96 C, 96 B, 96 WG; 339/185, 205

[56] References Cited
UNITED STATES PATENTS

| | | | |
|---|---|---|---|
| 3,789,485 | 2/1974 | Gudmestad | 350/96 C X |
| 3,846,010 | 11/1974 | Love et al. | 350/96 C |
| 3,883,681 | 5/1975 | Campbell | 350/96 C |

OTHER PUBLICATIONS

Millet, "Connector Mount for Fiber Optic Bundle" IBM Tech. Disc. Bul., vol. 14, No. 3, Aug. 71.
"Applied Optics" vol 13, No. 2, Feb. 1974, pp. 240-242.
Hudson and Thiel, "The Star Coupler" Applied Optics, vol. 13, No. 11, Nov. 1974.

Primary Examiner—John K. Corbin
Assistant Examiner—Stewart Levy
Attorney, Agent, or Firm—Russell J. Egan

[57] ABSTRACT

An improved connector is disclosed for interconnecting and terminating bundles of light transmitting fibers in such a manner as to have low light loss at the points of connection. The subject connector is suitable for use in either splicing or terminating individual bundles of light transmitting fibers, each bundle including at least one fiber, as well as for connecting a plurality of light transmitting fiber bundles in a single connector assembly. The subject connector includes an annular crimping ring, an annular cap member, and a profiled ferrule member all of which are slipped over the prepared end of a light transmitting fiber bundle. The end of the bundle is prepared by stripping the exterior layer therefrom to expose the light transmitting fibers. In the case of the bundle including a plurality of fibers, it may be preferable to also pretreat the bundle by applying a potting compound to the fibers to form them into a cohesive unit. The prepared end of the bundle is inserted through a profiled axial bore in the ferrule which guides and gathers the fibers at the face of the assembly. The bundle is secured in the ferrule by deforming the crimp ring in a conventional manner. The face of the ferrule and the fibers projecting therefrom are polished to present a smooth surface. The cap means is adopted to both engage the ferrule and a bushing, which can be a portion of a terminal, a multiple position connector, or a splice. An optional tubular strain relief member can be included to engage the bundle and be secured to the ferrule by the crimp ring.

30 Claims, 14 Drawing Figures

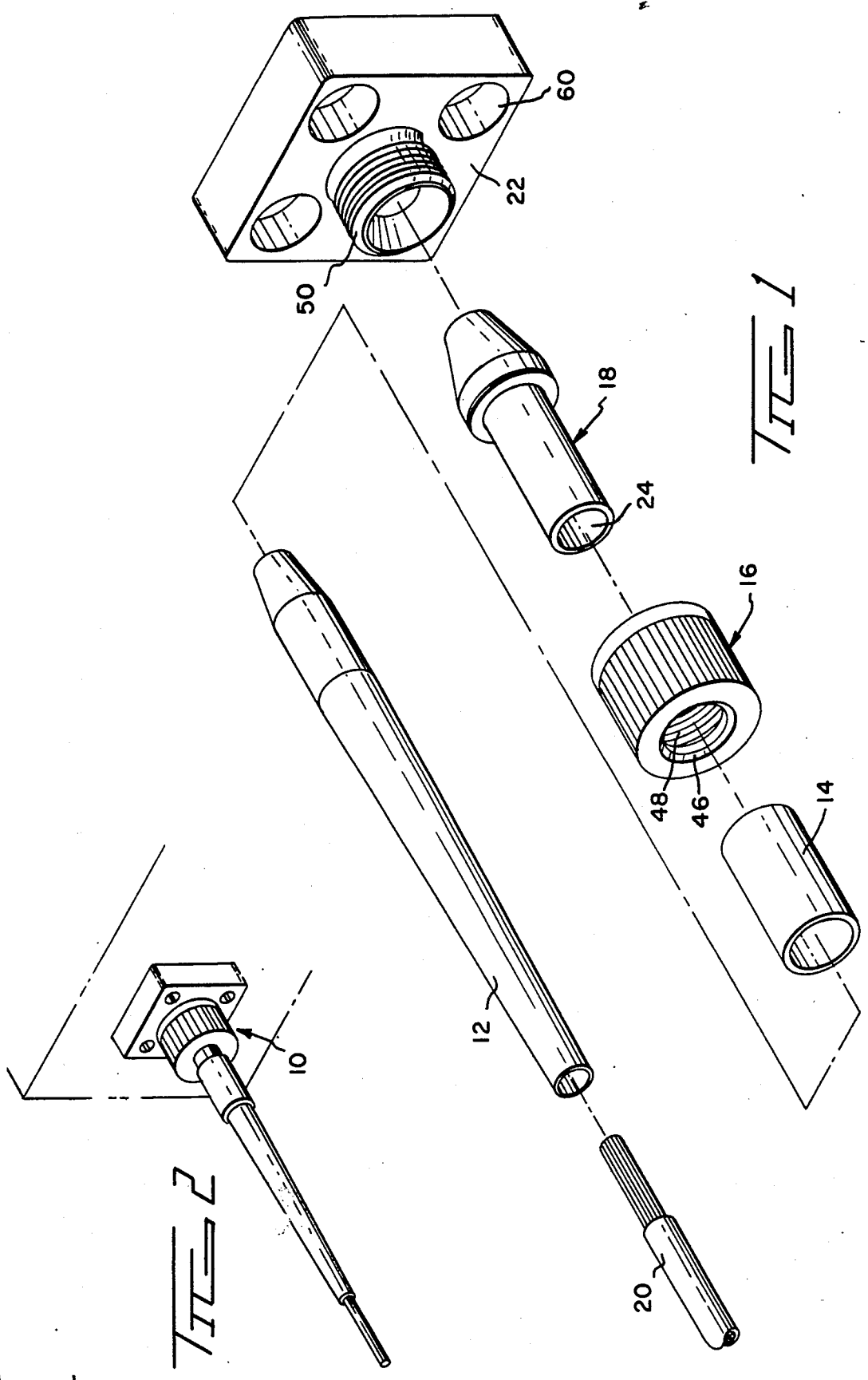

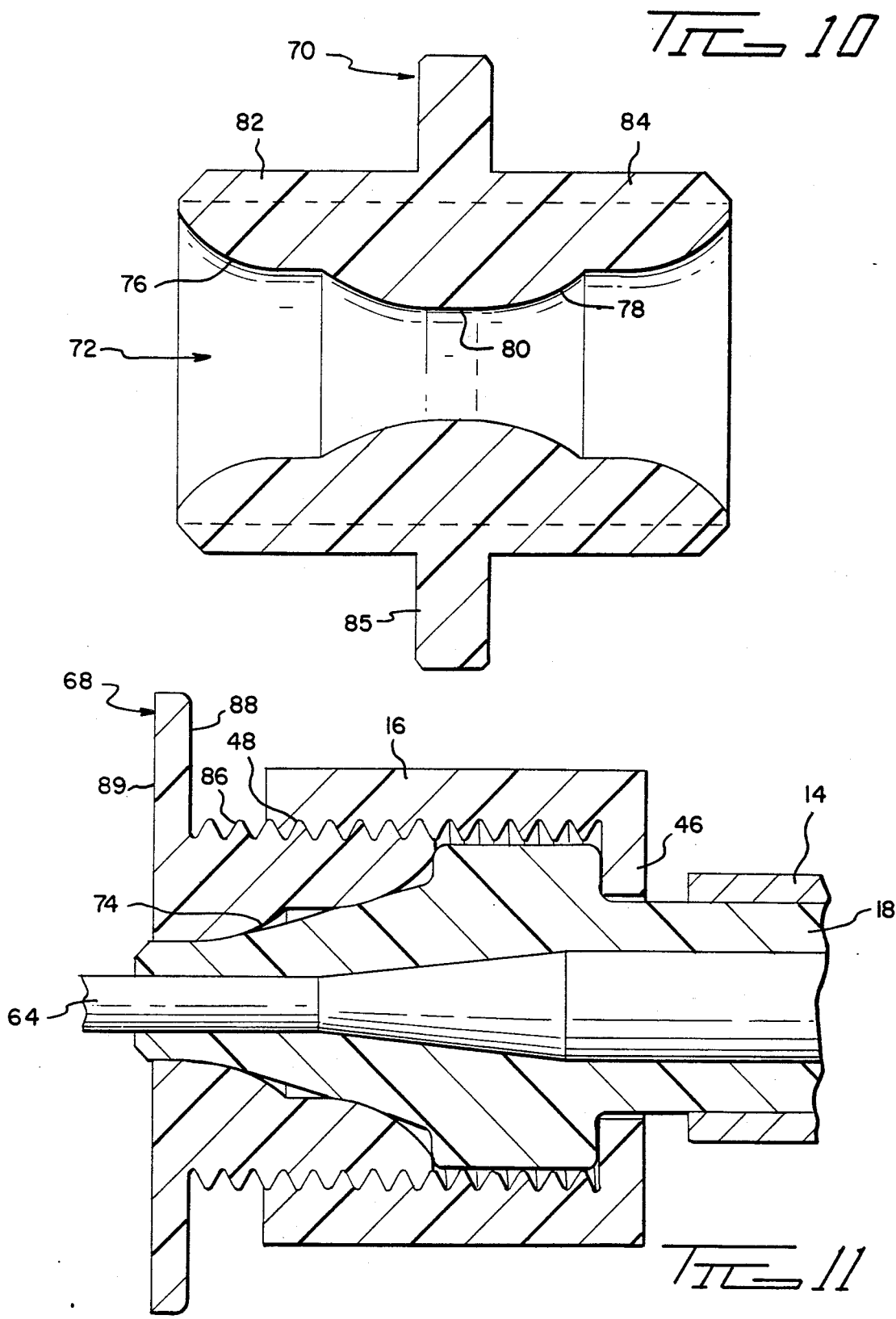

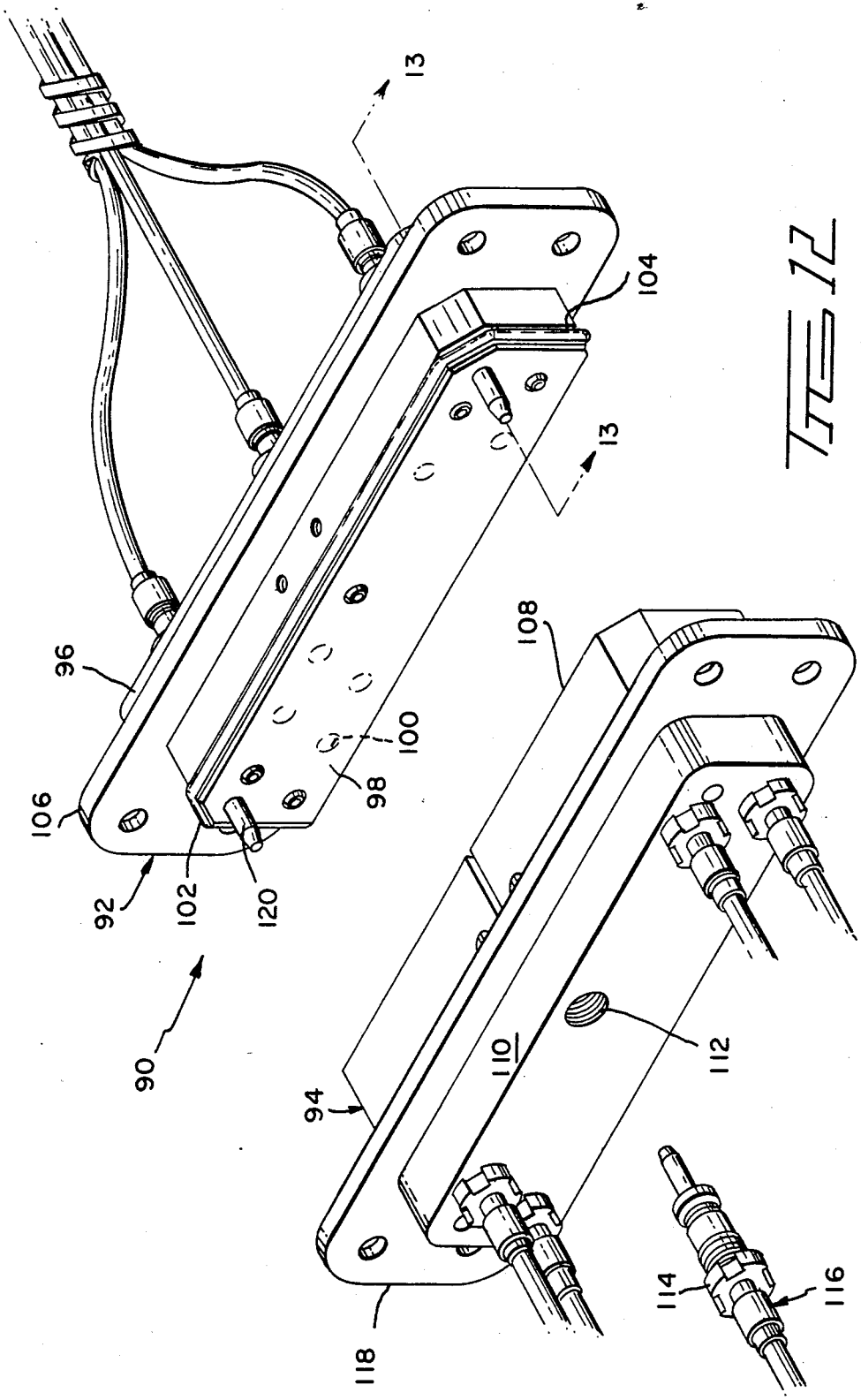

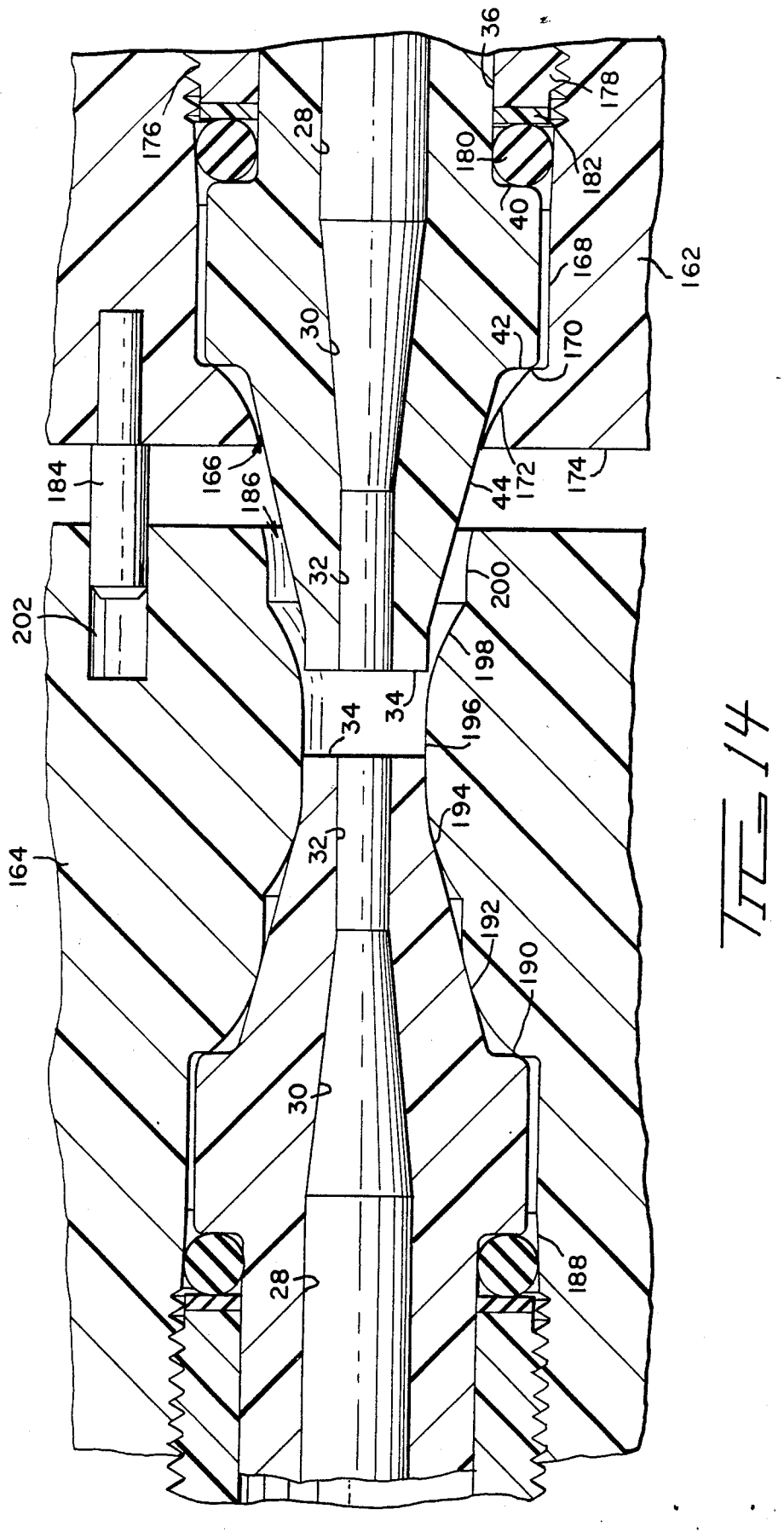

LIGHT TRANSMITTING FIBER BUNDLE CONNECTOR

BACKGROUND OF THE INVENTION

1. The Field Of The Invention

The present invention relates to a connector for terminating, joining, and splicing bundles of light transmitting fibers.

2. The Prior Art

Since the development of the art of transmitting light through fine fibers of glass and plastics material there has been a constant search for satisfactory methods and devices for splicing and coupling the fibers. Such methods and devices have encountered many substantial problems including both the light loss at the connection points as well as the difficulty in working with the extremely fine fibers.

Because of the extremely small dimensions of the light transmitting fibers, it has been more common to attempt to connect bundles or cables made up of a plurality of individual fibers. In such cases it is not necessary to have a one-to-one alignment of the individual fibers. However, the bundle must be placed in such position that there will be a substantial amount of light transmitted from cable to cable without an unacceptable loss of light.

One commonly known method for joining and/or terminating cables of light transmitting fibers is to insert the fibers into a sleeve of heat shrinkable material and then heat the joint to shrink the tube. Examples of this method can be found in U.S. Pat. Nos. 3,198,059; 3,301,648; 3,624,816; and 3,810,802. The obvious disadvantage to this technique is that the cables, once joined, cannot be separated with ease and without destroying the tube, with possible damage to the fibers.

An improved coupling of light between cables of light transmitting fibers can be obtained by placing a coupling material in the joint between the cables, as explained in U.S. Pat. Nos. 3,455,625 and 3,768,146. This, however, raises the problem of keeping the coupling material in place, especially when a fluid coupling material is employed.

The well known crimp termination technique has also been applied to cables of light transmitting fibers. Examples can be found in U.S. Pat. Nos. 3,637,284; 3,638,008; 3,655,275; 3,758,189; 3,790,791 and 3,803,409. For the most part these devices have been limited to termination of cables since there have been problems in obtaining satisfactory coupling of cables without undue light loss.

Some light transmitting fiber cable splicing techniques are disclosed in U.S. Pat. Nos. 3,783,065 and 3,798,099. These methods provide satisfactory coupling of the fiber cables but are permanent bonds.

U.S. Pat. Nos. 3,357,423 and 3,681,164 both describe bonding or potting the fibers at the free end of a cable and securing the end of the cable in an end cap or plug. The bonding or potting of the fibers allows them to be polished to form a smooth face with the fibers being retained in place regardless of the flexing of the cable.

A final method for detachably splicing light transmitting fiber cables is found in U.S. Pat. Nos. 3,734,594 and 3,829,195. This generally requires several annular elements one of which is deformed radially inwardly against the free ends of two fiber cables inserted therein to bring the fibers into substantial axial alignment. The annular element is preferably deformed by axial compression.

SUMMARY OF THE PRESENT INVENTION

The light transmitting fiber cable connector of the present invention includes an annular crimp ring, an annular cap member, and a ferrule member of plastics material, all of which are mounted on the cable, and a bushing member which receives the connector. The components are successively placed over the prepared end of a cable, including at least one light transmitting fiber, and secured thereon by deformation of the crimp ring. The crimp ring is a cylindrical member of deformable metal. The ferrule member is formed of plastics material having a profiled axial passage opening on a face end and a profiled exterior including at least one integral radially outwardly directed flange and a tapered nose portion leading to the face end. The axial passage is profiled so that the fibers of the bundle will be gathered together as they pass therethrough. One end of the cap member includes a flange adapted to engage with the flange of the ferrule while the opposite end is adapted to detachably engage the bushing by any of the well known means, such as threads. The bushing can be associated with a further optical component, such as a transmitter or receiver package, a splice with another fiber optics cable or another suitable optical device. The individual fibers making up the cable or bundle are preferably adhered to one another and to the face end of the ferrule by the application of a potting mixture, such as an epoxy resin, thereto. This face end of the ferrule is polished to produce a smooth coplanar surface across the ends of all of the fibers and the ferrule.

It is therefore an object of the present invention to produce an improved light conducting fiber cable connector which can be used for joining like cables together, connecting individual cables to individual mountings, and to connect cables of fibers to multiple position connector assemblies.

It is another object of the present invention to produce an improved light conducting fiber cable connector which allows the close spacing of the cables in a multiple cable connector assembly.

It is another object of the present invention to produce a universal end termination adapted to connect a light transmitting fiber cable to a transmission package, a receiver package, another similar cable to effect a splicing of the cables, or to other optical components.

It is yet another object of the present invention to produce a light transmitting fiber cable connector with improved packing of the fibers constituting the cable at the face of the connection.

It is still another object of the present invention to provide a sealed connection for protecting coupled light transmitting fiber bundles from adverse environmental conditions.

It is a further object of the present invention to provide a light-weight connector for connecting light transmitting fiber cables.

It is a still further object of the present invention to utilize a non-metallic ferrule in a light transmitting fiber cable connector which will allow polishing of the end face of the ferrule and fibers without derogatory effects on the individual fibers.

It is a still further object of the present invention to produce an improved light transmitting fiber cable connector which can be readily and economically produced.

The means for accomplishing the foregoing objects and other advantages of the present invention, which will be apparent to the skilled artisan, are set forth in the following detailed description taken with reference to the accompanying drawings.

BRIEF DESCRIPTION OF THE DRAWINGS

FIG. 1 is an exploded perspective view of the subject light transmitting fiber cable connector;

FIG. 2 is a perspective view of the assembled connector of FIG. 1;

FIG. 10 is a longitudinal section through a splice bushing;

FIG. 11 is a longitudinal section through a polishing bushing with a connector in place;

FIG. 12 is a partially exploded, perspective view of a multi-position connector assembly incorporating the subject light transmitting fiber cable connector therein;

FIG. 14 is an enlarged section, similar to FIG. 13, taken through an alternate connector block incorporating the subject invention therein.

DETAILED DESCRIPTION OF THE PREFERRED EMBODIMENT

Figure 3:
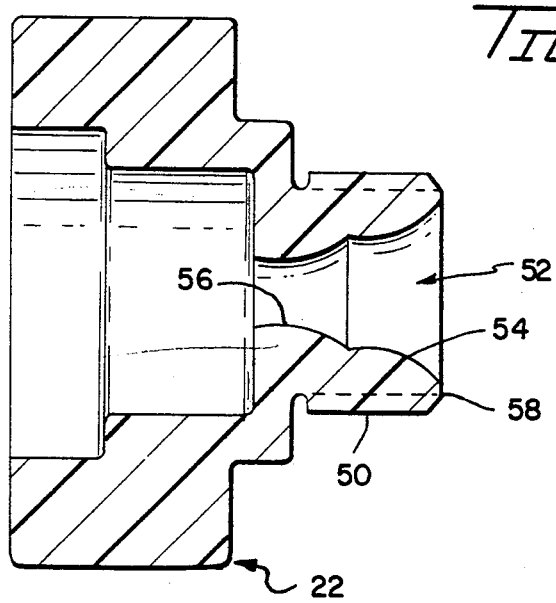
FIG. 3 is a longitudinal section through the bushing of FIGS. 1 and 2.

The subject light transmitting fiber cable connector 10 includes a profiled cylindrical strain relief member 12 of resilient material, a cylindrical crimp ring 14 of malleable metallic material, a cap member 16 and a profiled ferrule member 18. The connector is adapted to connect a cable of light conducting fibers 20 with a bushing 22. It should be here noted that the light transmitting fiber cable 20 is of the well known type and includes a bundle of at least one light transmitting fiber of plastics or glass material enclosed in a known type of jacketing cover which provides both shielding and strength to the cable.

The strain relief member 12 is an optional portion of the connector and need not be included if the jacketing cover of the cable provides adequate strain relief. The member is simply a cylindrical tube of flexible material which can be secured to the cable 20 by known means, such as adhesives, and to the connector by deforming ring 14 to crimp one end of the member 12 against the ferrule member 18.

Figure 4:
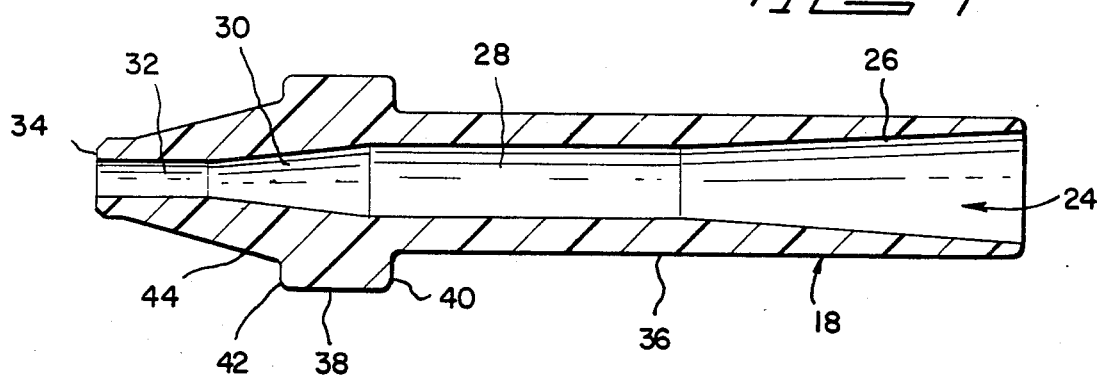
FIG. 4 is a longitudinal section through the ferrule of FIGS. 1 and 2.
Figure 5:
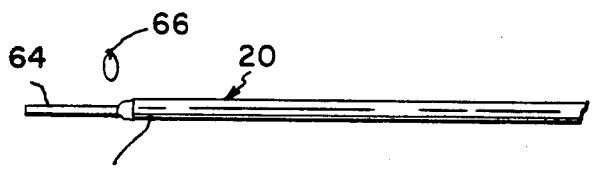
FIGS. 5 to 9 are diagrammatic views showing the steps in assembling the connector of FIG. 1.
Figure 6:
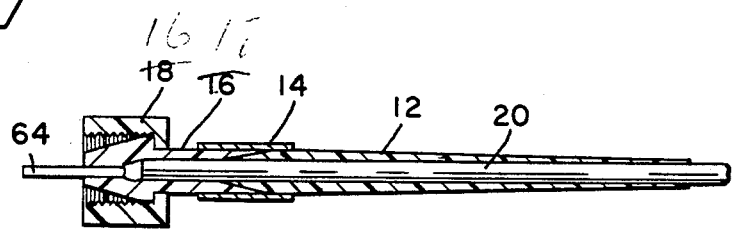
Figure 7:
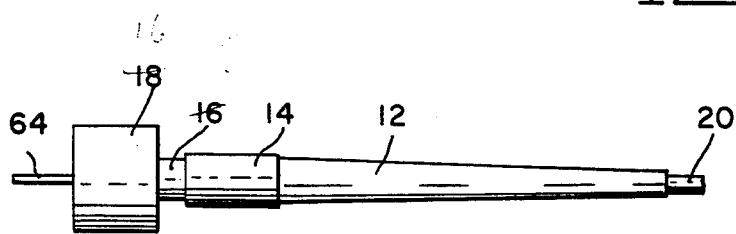
Figure 8:
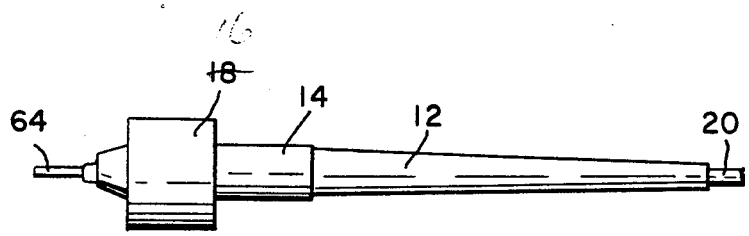
Figure 9:
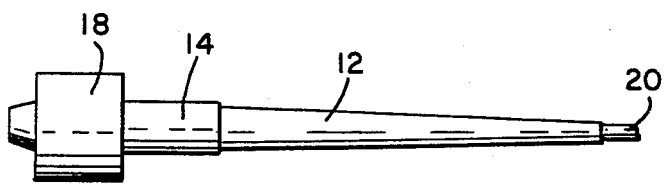

The ferrule member 18, see FIG. 4, is an integral body of plastics material having a profiled axial bore 24 including a first conical section 26, a cylindrical section 28, a second conical section 30, and a second cylindrical section 32 which opens upon the end face 34 of the ferrule member. The profiled exterior of the ferrule member includes a cylindrical rear section 36, an outwardly directed flange 38 forming spaced, parallel annular shoulders 40, 42 and a tapered substantially profiled conical nose 44, which likewise leads to the end face 34.

One end of the cap member 16 has an inwardly directed flange 46 adapted to abut the shoulder 38 of the ferrule member. The opposite end of the cap member includes engaging means 48 adapted for detachable assembly with a similar engaging means 50 on the bushing 22. The engaging means 48, 50 can be selected from any of the well known means, such as screws threads, bayonet couplings and the like. The bushing includes a profiled annular passage 52 having successively smaller first an second portions 54, 56, respectively, adapted to receive the profiled nose end 44 of the ferrule member in such a manner as to provide at least two good light tight annular seals therebetween. These seals, together with shoulder 42 abutting the face 58 of the bushing, also provide environmental tight protection for the polished end face 34 preventing entry of corrosive products, films, foreign objects and the like which could cause damage to the polished face thereby reducing the light transmission efficiency thereof. The bushing aperture causes a reduction of the diameter of the ferrule when the connector is completely positioned thereon, to secure the fibers therein. The opposite end of the annular passage 56 can be profiled to receive therein the above-mentioned optical components (not shown). The bushing also includes mounting apertures 60 for attachment to related components, now shown.

The steps of assembling the subject connector on a cable including at least one light transmitting fiber are outlined in FIGS. 5 to 9 and include the step of preparing the cable 20 by stripping a portion of the jacket layer 62 from the end thereof to expose the individual fibers 64. A small amount of potting compound 66, such as epoxy resin, is applied to the exposed fibers. The strain relief member 12, if required, the crimp ring 14 and the cap member 16 are sequentially slipped over the free end of the cable. The prepared free end of the cable is inserted axially through the bore 24 of the ferrule until the fibers 64 extend from the end face 34 of the ferrule 18. During this insertion the individual fibers are guided and gathered together as they pass through the tapered portions 26 and 30. The fibers at the end face 34 are gathered closely together but are not tightly packed. The nose of the ferrule is then inserted into a polishing bushing 68, see FIG. 11, which squeezes the nose portion 44 of the ferrule 18 and causes a tight gripping of the fibers 64 lying within portions 30 and 32 of bore 24. The ferrule 18 is held in this position by engagement of the cap member 16 with the bushing 68 while the potting material 66 cures. The crimp ring 14 is deformed to secure the ferrule 18 to the cable 20 and provide at least some strain relief therebetween. The crimp ring also will capture and limit the rearward motion of the cap member 16 and serves to secure everything in place while the potting material fully cures. As mentioned previously, when a strain relief member 12 is included, the crimp ring 14 will secure the strain relief member 12 to the ferrule 18. The cured potting material serves to bind the fibers in place during polishing and to secure them to the ferrule. The crimp ring and the cured potting material work together to prevent the fibers from pulling out of the polished end face during handling or flexing of the cable. The fibers 64 and the ferrule end face 34 are polished by conventional means to form a smooth surface which assures a good light transmission therethrough. The non-metallic material of the ferrule assures there will be no scratching of the end face during the grinding and polishing operations. A metallic ferrule could allow bits of metal to be smeared across the end face scratching both it and the individual fibers.

The above-described steps of applying a potting material to the cable and the polishing are both well known procedures and are subject to many modifications and variations. For example, the potting material could be applied to the fibers after they have been inserted into the ferrule, with the potting material being drawn in between the fibers by capillary action. It is also foreseen that it would be possible to polish large numbers of cables by attaching polishing bushings to a disc associated with a polishing wheel so that large quantities of cables could be polished in a single operation.

While the use of tapered passageways to gather fiber bundles in known, the subject ferrule achieves a particular advantage over the prior art. The bore 24 in ferrule 18 allows for a rather loose bundle of fibers to be inserted and gathers them together with the tapered lead-in portions 26 and 30 without tightly packing the fibers. The known tapered lead-ins have required the fibers to be pushed under high force through the tapered portions which results in a high percentage of breakage of the fibers. The subject invention will have a rather low expected number of fibers being broken since the fibers are only grouped closely together as they pass through the ferrule with relatively low force. At the face end 34 the fibers are closely gathered but are not tightly packed. Thus the problem of breakage of the fibers is substantially eliminated. It is the interaction between the nose of the ferrule and the mating bushing which causes the actual tight packing of the fibers. The fibers are sufficiently tightly packed by the bushing 22 exerting a force against the nose 44 of ferrule 18 which is substantially radial and perpendicular to the axis of the fibers.

The splice bushing 70 of FIG. 10 and the polishing bushing 68 of FIG. 11 are both quite similar to the bushing 22, shown in FIGS. 1 to 3, in regard to the profile of their respective axial bores 72, 74. As explained above, the profiled bore is designed to cooperate with the nose of the ferrule 18 which is inwardly deformed to form at least one annular environmental tight seal between the bushing and the ferrule. Such a seal will also assure that the above-discussed limited light losses will be obtained.

The splice bushing of FIG. 10 is in effect a double ended version of the bushing of FIG. 3, while the polishing bushing of FIG. 11 is a foreshortened version of the bushing of FIG. 3. The splice bushing is symmetrical with respect to a plane extending normal to the axial bore 72. The bore 72 has identical first and second profiled portions 76, 78 leading to a central cylindrical portion 80. The outer surface of the bushing is provided with first and second engaging means 82, 84 adapted to receive the cap members 18 thereon. A centrally disposed, radially directed, integral flange 85 is provided to assist in handling the bushing. However, this flange could also form part of a multi-cable connector, such as the one described below. The polishing bushing 68 includes a single profiled bore 74, engaging means 86 and flange 88. The polishing bushing 68 can be incorporated into a polishing wheel or disc, as described above, by extending flange 88. The nose of the ferrule and the fibers extending therethrough would subsequently be polished to be coplanar with the face 89 of the flange 88.

A multiple cable connector assembly 90 is shown in FIG. 12 and incorporates therein a plurality of the above-described individual light conducting fiber cable connectors 10. In this embodiment the assembly includes matable first and second housing members 92, 94 respectively. The first housing member 92 includes a body 96 having a mating face 98. A plurality of cable receiving bores 100 extend through the body to the mating face. An annular O-ring 102 is mounted in a groove 104 surrounding the mating face. An integral flange 106 extends outwardly from body 96 and serves for mating or securing the assembly together. The second housing member 94 includes a hooded portion 108 extending from body 110 and surrounding a mating face (not shown). The hooded portion is profiled and dimensioned as to receive the O-ring 102 therein in a light tight and environmental tight engagement. The body 110 is also provided with a plurality of bores 112 leading to the mating face. Each bore is aligned with a like bore 100 and is provided with engaging means adapted to receive the cap member 114 of the respective cable connector 116. An integral outwardly directed flange 118 on body 110 serves for mounting and/or securing the assembly together. At least one guide or registration pin 120 extends from the face of the first member and is adopted to engage in like bores (not shown) in the mating face of the second member.

Figure 13:
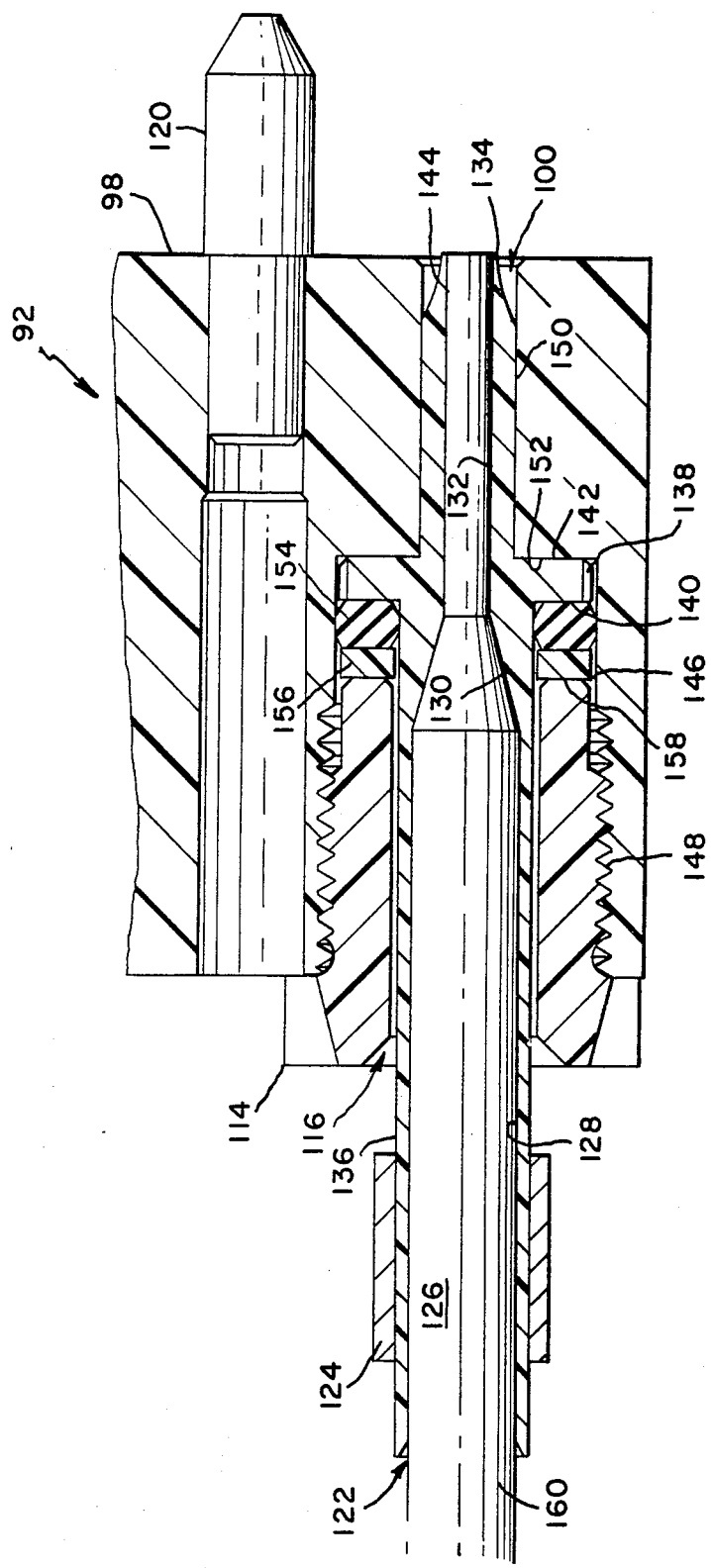
FIG. 13 is an enlarged section taken along line 13—13 of FIG. 12.

FIG. 13 is a section view taken along line 13-13 of FIG. 12 and shows the assembly of a cable connector 116 into the first housing member 92, the second housing member being identical. Connector 116 includes a ferrule 122, a crimp ring 124, and the cap member 114. A strain relief member, not shown, can be provided in the same manner as described with respect to the embodiment shown in FIGS. 1 and 2. The ferrule 122 has an axial passage 126 which includes a first cylindrical portion 128, a conical tapered portion 130, and a second cylindrical portion 132 which opens on end face 134. The outer profile of the ferrule includes a cylindrical surface 136, an integral radial flange 138, which defines first and second shoulders 140 and 142 respectively, and a profiled nose 144, which terminates at end face 134. The cable receiving bore 100 includes a connector receiving rear section 146, which includes mating means 148 adapted to engage corresponding means on the cap member 114, and a forward section 150, which opens on end face 98. A shoulder 152 is formed between the front and rear sections of the bore 100 and the shoulder 142 of the ferrule abuts the shoulder 152. A first annular member 154 of resilient material is positioned over the rear portion 136 of the ferrule and abuts the shoulder 140 and a second annular member 156 of rigid material is positioned against the opposite surface of the member 154. One end 158 of the cap member 114 abuts the member 156 and, when engaged with means 148 compresses the member 154 between the member 156 and the shoulder 140 of the ferrule. Thus the resilient first annular member provides for a small amount of axial movement of the ferrule 122 with respect to the housing 92. As shown in FIG. 13, the face end 134 of the ferrule 122 will normally protrude slightly from the mating face 98 of an unmated housing block. The pin 120 will be received within a corresponding recess in the opposite housing block to correctly align the housings with the corresponding cable in alignment. The free ends of the cables will be brought into an abutting relationship and biased against one another by their respective resilient annular members 154. Thus a good light transmitting interconnection between the cables 160 is assured.

An alternate multiple cable connector assembly is shown in FIG. 14 and includes a plug housing 162 and a receptacle housing 164. Each housing is adapted to receive connectors similar to that described with respect to FIG. 1 and therefor identical reference numerals will be used where appropriate. The plug housing 162 includes a plurality of connector receiving bores 166 each of which includes a cylindrical rear portion 168 joined, at shoulder 170, to a profiled converging portion 172 which opens on mating face 174. Included in the rear portion 168 is means 176 for detachably engaging similar means on the cap member 178. The shoulder 170 is dimensioned to engage shoulder 42 of the ferrule member. A resilient annular member 180 and a rigid annular member 182 are mounted on the cylindrical portion 36 of the ferrule with the resilient member 180 engaging shoulder 40 and rigid member 182 engaging cap member 178. An alignment pin 184 is fixed to housing 162 extending normal to the mating face 174.

The receptacle housing 164 includes a plurality of connector receiving bores 186 each of which includes a cylindrical rear portion 188 connected by shoulder 190 to a profiled passage including first and second inwardly tapered sections 192, 194, respectively, cylindrical central section 196, and third and fourth outwardly tapering sections 198, 200, respectively. When a connector is mounted in the bore 186, its end face 34 preferably extends beyond the midpoint of the cylindrical center section 196 with at least two annular seals being formed between the nose of the connector ferrule and sections 192 and 194.

When the housings are mated, pin 184 engaging in recess 202, the end faces 34 of the respective blocks will engage with the resulting axial thrust therebetween being absorbed by the respective resilient annular members 180. The connector ferrule of the plug housing will seat in the bore 186 making at least two annular seals with sections 198 and 200.

There are many advantages to both of the multiple cable connector assemblies described above including the cables are not permanently fixed in the housing. Thus it is possible to replace or exchange individual cable connections while the remaining cables of the assembly are undisturbed. Each connector assembly has a certain degree of axial float which will compensate for the tolerances associated with polishing the fiber bundles so that all of the bundles and the multiple position connector will remain in intimate contact with whatever optical device or bundle is in the opposing connector half. The cable connectors can be foreloaded into the respective housings so that a minimum tensile load is required before intimate contact is disturbed.

The fiber cables are inserted into the ferrule members shown in FIGS. 13 and 14 in the same manner as described with reference to FIGS. 5 to 9. The individual cable connectors likewise can be engaged with the respective housing blocks by conventional means, such as the mating threads which are illustrated.

The present invention may be subject to many modifications and changes without departing from the spirit or essential characteristics thereof. The present embodiments are therefore to be considered in all respects as illustrative and not restrictive as to the scope of the invention.

What is claimed is:

1. A connector for joining cables of bundles of light transmitting fibers together and to related components, said connector comprising:
   a ferrule member of plastics material having a profiled axial passage extending from a first end to a second end and an outwardly directed integral flange, said passage being dimensioned to gather but not tightly pack the fibers therein;
   a malleable metallic crimp ring having an internal diameter larger than the exterior diameter of said ferrule and adapted to secure said cable to said ferrule;
   a cap member having an axial bore and an inwardly directed annular flange at one end thereof defining an aperture with a diameter less than the diameter of said ferrule member flange, and attachment means on the other end of said cap; and
   a bushing member including a profiled axial passage having one end adapted to receive said first end of said ferrule and attachment means adapted to detachably engage said attachment means of said cap member, said bushing member applying a radial compressive force to said first end of said ferrule causing a reduction in the diameter thereof whereby said fibers are tightly packed.

2. A connector according to claim 1 wherein the profiled axial passage of said ferrule member includes at least one inwardly tapered portion adapted to gather individual fibers extending therethrough into a loosely compacted bundle.

3. A connector according to claim 1 wherein said attachment means on said cap member and said bushing member comprise mating threaded portions.

4. A connector according to claim 1 wherein said axial passage of said bushing member is dimensioned to compress said first end of said ferrule member inserted therein to define therebetween at least one annular seal.

5. A connector according to claim 4, wherein said bushing member is dimensioned to compress said first end of said ferrule member sufficiently to compress fibers in said axial passage into a tightly compacted bundle.

6. A connector according to claim 1 further comprising a potting compound applied to fibers inserted through said axial passage of said ferrule member, said compound, upon curing, bonding said fibers together and to said ferrule member.

7. A connector according to claim 6 wherein said potting compound is an epoxy resin.

8. A connector according to claim 1 wherein said bushing member is symmetrical about a plane normal to the axis of said axial passage, said axial passage including identical profiled portions leading to a central cylindrical portion, whereby said bushing serves to splice together two light transmitting fiber cables.

9. A connector according to claim 1 wherein said bushing member includes a plurality of like profiled axial passages, each having a respective attachment means, whereby a plurality of cables can be simultaneously terminated.

10. A connector according to claim 1 wherein said first end of said ferrule member has an outer profile adapted to make an interference fit with said profiled axial passage in said bushing member.

11. A connector according to claim 10 wherein said interference fit defines at least one annular seal between said ferrule member and said bushing member.

12. A connector according to claim 10 wherein said profiled axial passage is dimensioned to compress said first end of said ferrule member inwardly to at least partially collapse said profiled axial passage of said ferrule whereby fibers extending therethrough are tightly secured therein.

13. A connector according to claim 1 further comprising:
a strain relief means including a tubular member adapted to be secured by one end to a cable and by the other end to said ferrule member by said crimp ring.

14. A connector according to claim 1 wherein said bushing member is adapted to receive a portion of a further optical component in the opposite end of said passage.

15. A connector according to claim 14 wherein said component is a transmitter package.

16. A connector according to claim 14 wherein said component is a receiver package.

17. A connector according to claim 1 further comprising:
an annular resilient member mounted around said ferrule member between said flange and said cap member, whereby a limited amount of axial float of said ferrule in said bushing member is achieved.

18. A connector according to claim 17 further comprising:
a rigid annular member mounted between said resilient annular member and said cap member.

19. A connector assembly for light transmitting fiber cables, each said cable including at least one light transmitting fiber, said connector comprising:
a first housing member having a plurality of profiled passageways extending therethrough from a cable receiving end to a mating face,
cable attachment means at the cable receiving end of each of said passageways in said first housing member;
a second housing member having a like plurality of passageways extending therethrough from a cable receiving end to a mating face, each said passageway of said second member being aligned with a like passageway in said first member,
cable attachment means at the cable receiving end of each of said passageways in said second housing member,
hood means adopted to sealingly engage said first and second members to encompass their respective mating faces in a light and environmental tight fashion,
means to align and secure said first and second members together, and
a plurality of light transmitting fiber cable connectors each attached to a respective cable, each said connector including a ferrule of plastics material having a profiled axial bore leading to an end face and an integral outwardly directed flange, said bore being dimensioned to gather said fibers in a loosely compacted bundle, a cap member having a axial passage with an inwardly directed annular flange at one end thereof and attachment means at the opposite end, and an annular malleable metallic crimp ring, each said connector member adapted to be mounted with its ferrule extending into a respective passageway of one of said housing members with its cap member securely attaching said connector thereto, said passageways compressing said ferrules causing a reduction in the diameter thereof whereby said fibers form a tightly packed bundle.

20. A connector assembly according to claim 19 wherein the profiled axial bore of said ferrule member includes at least one inwardly tapered portion adapted to gather individual fibers extending therethrough into a loosely compacted bundle.

21. A connector assembly according to claim 19 wherein said attachment means on said cap member and said housing members comprise mating threaded portions.

22. A connector assembly according to claim 19 wherein said profiled passageways in said housing members are dimensioned to compress a ferrule member inserted therein adjacent the end face thereof to define therebetween at least one annular seal.

23. A connector assembly according to claim 22, wherein said profiled passageways in said housings are dimensioned to compress said ferrule member sufficiently to compress fibers within said axial passage into a tightly compacted bundle.

24. A connector assembly according to claim 19 further comprising a potting compound applied to fibers inserted through said axial passage of said ferrule member, said compound, upon curing, bonding said fibers together and to said ferrule member.

25. A connector assembly according to claim 19 wherein said ferrule member has an outer profile adjacent said end face adapted to make an interference fit with said profiled passageways in said housing members.

26. A connector assembly according to claim 25 wherein said interference fit defines at least one annular seal between said ferrule member and the respective one of said housing members.

27. A connector assembly according to claim 25 wherein said profiled passageways in said housing members are dimensioned to compress said profiled end of said ferrule member inwardly to at least partially collapse said profiled axial passage of said ferrule whereby fibers extending therethrough are tightly secured therein.

28. A connector assembly according to claim 19 further comprising:
an annular resilient member mounted around said ferrule member between said flange and said cap member, whereby a limited amount of axial float of said ferrule in said bushing member is achieved.

29. A connector assembly according to claim 28 further comprising:
a rigid annular member mounted between said resilient annular member and said cap member.

30. A connector assembly according to claim 19 wherein:
each said passageway of one of said housing members is profiled to receive a cable connector in each end thereof and in substantial axial alignment.

* * * * *